United States Patent [19]

Itoh et al.

[11] Patent Number: 4,819,588
[45] Date of Patent: Apr. 11, 1989

[54] INTAKE APPARATUS FOR AN ENGINE

[75] Inventors: Toshinobu Itoh; Noriyuki Nakaso; Takashi Takino; Mutsukata Mishima, all of Hiroshima, Japan

[73] Assignee: Mazda Motor Corporation, Hiroshima, Japan

[21] Appl. No.: 22,874

[22] Filed: Mar. 6, 1987

[30] Foreign Application Priority Data

Mar. 8, 1986 [JP] Japan .................... 61-50991
Mar. 17, 1986 [JP] Japan .................... 61-57074

[51] Int. Cl.4 ............................................ F02M 35/10
[52] U.S. Cl. ................................................ 123/52 M
[58] Field of Search ......... 123/52 M, 52 MB, 52 MV, 123/198 E; 180/292

[56] References Cited

U.S. PATENT DOCUMENTS 2,991,778  7/1961  Kolbe et al. ............... 123/52 MV
4,205,729  6/1980  Morino ....................... 180/292
4,276,862  7/1981  Matsumoto ................. 123/52 M
4,409,934 10/1983  Kaindl ......................... 123/52 M
4,653,440  3/1987  Fukuhara et al. .......... 123/52 MB Primary Examiner—Willis R. Wolfe
Attorney, Agent, or Firm—Wegner & Bretschneider

[57] ABSTRACT

A plurality of intake ports having each an opening on one side surface of an engine body are connected to a surge tank disposed over the engine body through each of plural separate intake tubes juxtaposed in the direction of the cylinder arrangement. Each of separate intake tubes is designed so as to extend in the direction apart from one side surface of the surge tank and then be curved in the direction turning toward one side surface of the engine body. The separate intake tubes are arranged such that the separate intake tube located on the end side has an opening on the surge tank at a position higher than that proximate thereto.

16 Claims, 6 Drawing Sheets

FIG.3

INTAKE APPARATUS FOR AN ENGINE

BACKGROUND OF THE INVENTION

1. Field of the Invention

The present invention relates to an intake apparatus for an engine and, more particularly, to an intake apparatus for an engine having a surge tank with an intake-air increasing chamber on an intake passage.

2. Description of the Prior Art

Many engines, particularly engines for automobiles, have a surge tank with an intake-air increasing chamber on an intake passage. As the surge tank has a considerably large volume, it is usually mounted over the engine.

Recently, multiple cylinder engines have been developed with the attempt to improve a charging efficiency by the supercharging due to dynamic effects such as an inertial effect. They are designed such that a surge tank is connected to a plurality of cylinders disposed in an engine body separately with a separate intake tube. For those engines, it is desired to make each of the separate intake tubes as long as possible in order to achieve dynamic effects in the range of a low engine speed. The longer the length of the separate intake tube is, the lower an engine speed producing the dynamic effects is. It is a matter of course that the lengths and the sizes of the separate intake tubes are rendered equal to each other in order to allow each cylinder to achieve the dynamic effects of the intake air in an equal manner.

As have been described above, in instances where a long separate intake tube is used, it is important how to arrange for such long separate intake tubes in an engine room in order to compact an engine as a whole. In particular, for an engine body having a plurality of cylinders, it is the issue how to minimize a degree of protrusion of the separate intake tubes toward one side surface of an engine body because the engine body is provided on one side surface thereof with a plurality of intake ports extending from the cylinders.

Japanese Utility Model Application (Early Publication) No. 175,666/1984 discloses an arrangement for a surge tank so as to extend in the direction of the cylinder arrangement and be mounted over an engine body, while separate intake tubes connecting independently plural intake ports to the surge tank are each of a curved shape. More specifically, the separate intake tube is designed so as to extend in a direction apart from one side surface of the surge tank and then be curved in a U-shaped manner turning toward one side surface, i.e., an intake port, of the engine body. With this arrangement, a degree of protrusion of each of the separate intake tubes from the one side surface of the engine body can be rendered equal to each other, while the degree can be minimized as small as possible.

However, such an arrangement for the separate intake tubes does not satisfy a demand for a reduction in the degree of protrusion of the separate intake tubes from one side surface of the engine body. In particular, an engine for an automobile is provided around the engine body with a variety of large-size instruments and devices, and it is anticipated in some cases that a curved portion of each of separate intake tubes located on one end side in the direction of the cylinder arrangement may block an arrangement of such instruments and devices. For example, in an automobile, there is used a servo apparatus for increasing an force pressed on a brake pedal in many cases. The servo apparatus is generally of the type using a pressure differential between the intake negative pressure and the atmospheric pressure. The servo apparatus of this type has usually a large diameter. Accordingly, in instances where an engine body is accommodated in an engine room formed in the front of a vehicle chamber in such a manner that, for example, cylinders are arranged in a lengthwise direction of the vehicle body, the problem will arise that the installment or detachment of the servo apparatus is caused to be very inconvenient because it is impossible to ensure a sufficient space in the transverse direction between curved portions of separate intake tubes positioned at one end side in the direction of the cylinder arrangement on the rear side of the vehicle body and the servo apparatus.

Furthermore, recently, many attempts have been made such that a control valve is mounted in each of the separate intake tubes, as have been described hereinabove, so that a degree of an opening of the control valve is designed so as to be controlled in accordance with a mode of operation of an engine. The plural control valves are driven by one actuator so that a connecting shaft is rotatively held with the separate intake tubes and the actuator is coupled with the control valves through the connecting shaft. In this case, in order to avoid as much as possible that the actuator protrudes to a large extent toward the end side in the direction of the cylinder arrangement of the engine, the actuator is mounted nearly at the middle position among the plural separate intake tubes in the direction of the cylinder arrangement and the connecting shaft is divided into two nearly at the middle portion in the direction of the cylinder arrangement, as disclosed in Japanese Patent Application (Early Publication) No. 192,825/1984. However, as the connecting shaft is divided into two, it is necessary to cause at least one portion to be exposed to the outside for each of the divided connecting shaft portion. In other words, at least two portions are required to be exposed to the outside for one connecting shaft. This results in the fact at least two portions are required to seal the inside of the separate intake tube from the outside. This is the disadvantage in terms of preventing a seal leakage.

SUMMARY OF THE INVENTION

The present invention has the first object to provide an intake apparatus for an engine designed to be capable of decreasing a degree of protrusion of a separate intake tube positioned on one end side in the direction of the cylinder arrangement from one side surface of an engine body, in an intake apparatus for an engine with a surge tank and each of the cylinders connected independently thereto through a continuous separate intake tube.

The present invention has the second object to provide an intake apparatus for an engine designed to be capable of preventing an engine from being made large pursuant to an arrangement for an actuator and minimizing portions for sealing between the inside and the outside of the separate intake tube pursuant to a provision with a connecting shaft, in an intake apparatus for an engine in which a control valve is mounted in each of the separate intake tubes and the plural control valves are driven by one actuator through the connecting shaft supported by the separate intake tube.

The first object according to the present invention is achieved by an intake apparatus for an engine constituted by:

an engine body having a plurality of cylinders arranged in series and having on one side surface thereof an opening to an intake port for each of the cylinders;

a surge tank located above on said engine body and extending in the direction of the cylinder arrangement;

a plurality of separate intake tubes connecting independently said surge tank to the intake port for each of said cylinders and being juxtaposed with each other in the direction of the cylinder arrangement;

each of said separate intake tubes being of a shape extending in a direction apart from one side surface of said surge tank and then being curved turning toward one side surface of said engine body; and the position of an opening for each of said separate intake tubes on said surge tank being arranged such that the position of the opening on one end side in the direction of the cylinder arrangement is higher and nearer to one side surface of said engine body than that on the side proximate thereto.

The second object according to the present invention is achieved by an intake apparatus for an engine having the construction, in addition to the construction constituted by the first object, in which a control valve is mounted in each of said separate intake tubes;

said control valves are connected to each other with a common shaft extending in the direction of the cylinder arrangement;

an actuator for driving said control valve is arranged in a space enclosed by said engine body and said plural separate intake tubes; and an output shaft of said actuator is connected to one end portion of said common shaft through a link mechanism.

BRIEF DESCRIPTION OF THE DRAWINGS:

FIG. 3 is a right side view of FIG. 1.

DETAILED DESCRIPTION OF THE PREFERRED EMBODIMENTS

Figure 1:
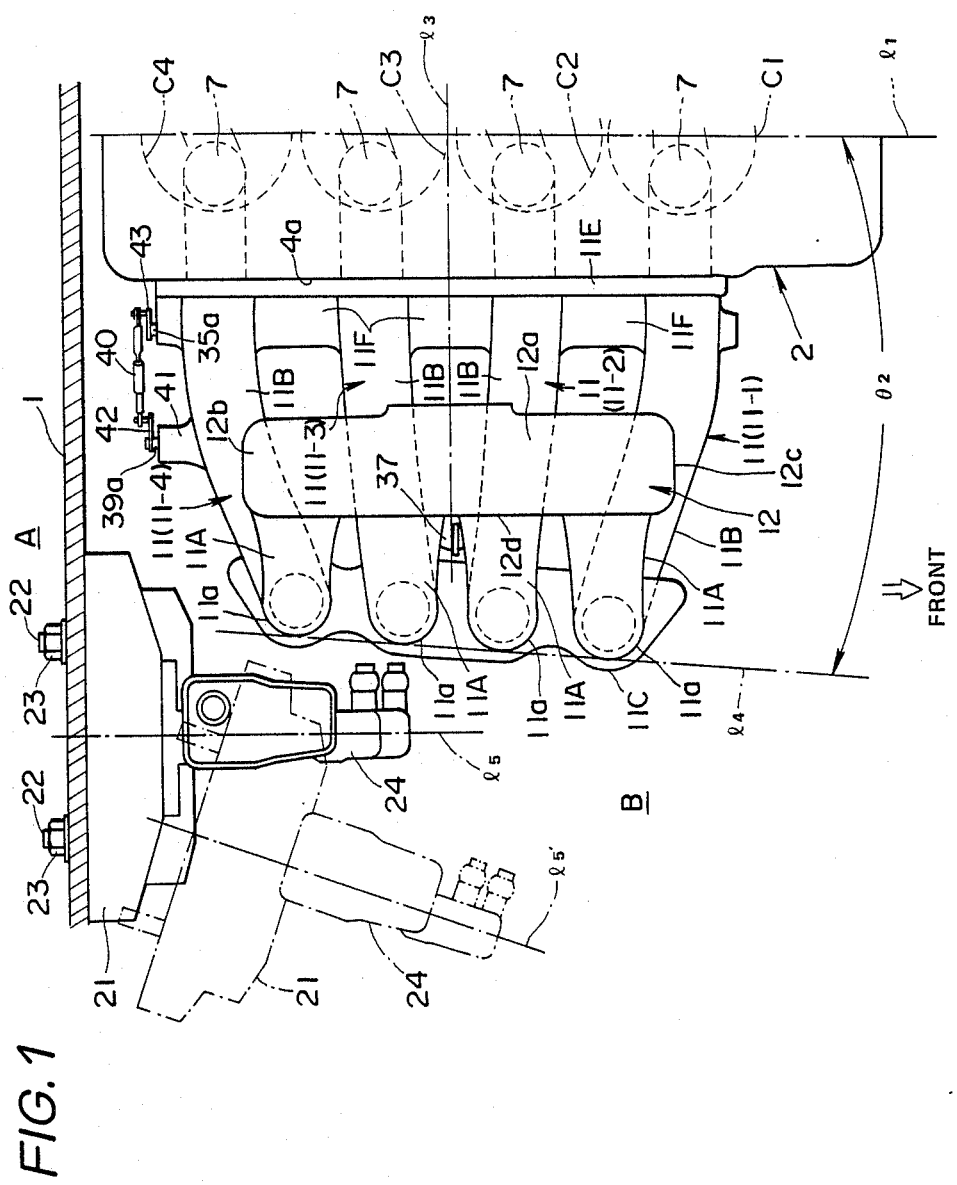
FIG. 1 is a top view illustrating an embodiment according to the present invention.

Referring to FIG. 1, reference numeral 1 denotes a dash panel of an automobile that extends in the widthwise direction and separates the inner vehicle space into a vehicle chamber A on the rear side thereof and an engine room B on the front side thereof.

In the engine room B is disposed an engine body 2 that is of the reciprocating type with four cylinders C1, C2, C3 and C4 arranged in series in the lengthwise direction so as to allow an axial line l1 passing through the respective axes of the cylinders C1, C2, C3 and C4. It is a matter of course that the axial line l1 extends in a direction identical to an engine output shaft (not shown) and the direction in which the axial line l1 extends in a direction of the cylinders arrangement.

Figure 2:
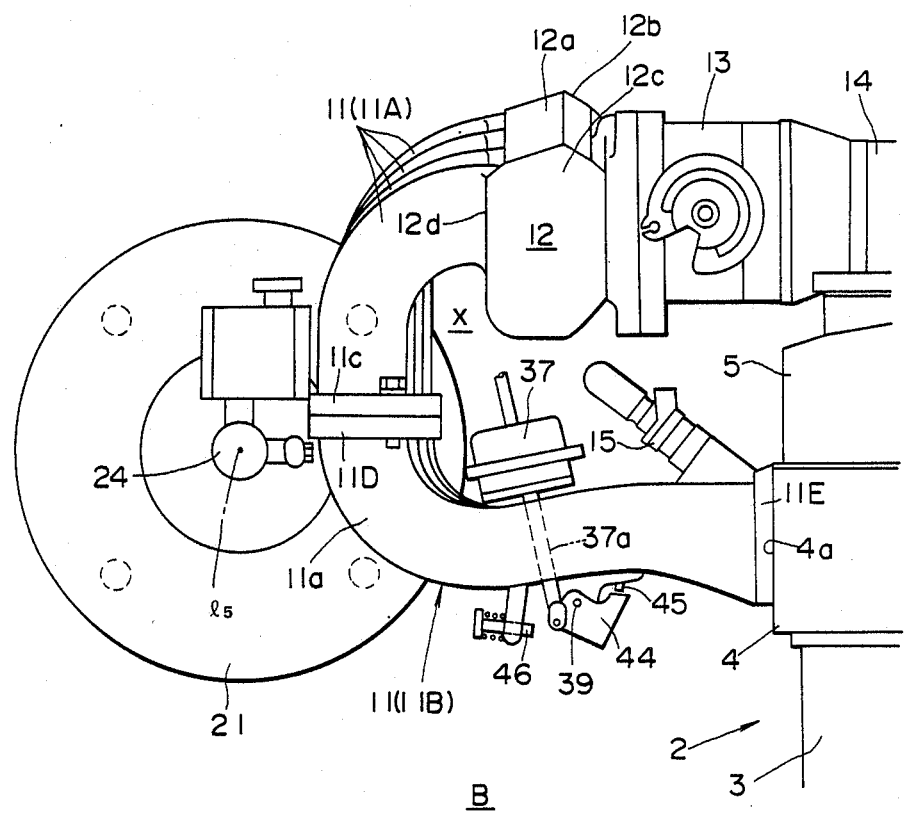
FIG. 2 is a front view of FIG. 1 as seen from the front side of the vehicle body.
Figure 5:
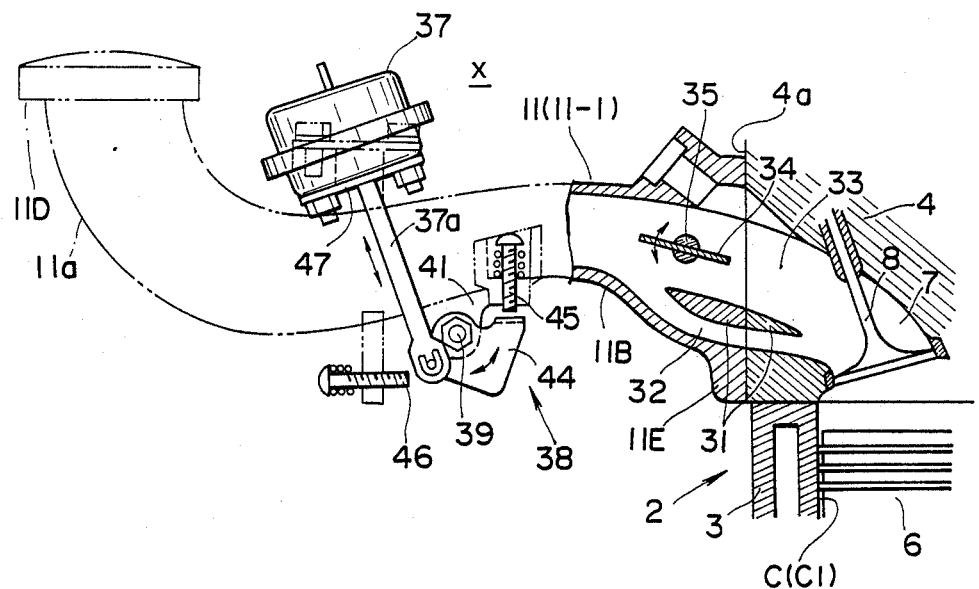
FIG. 5 is a sectional view illustrating the vicinity of an intake port with the detail of the essential portions.
Figure 6:
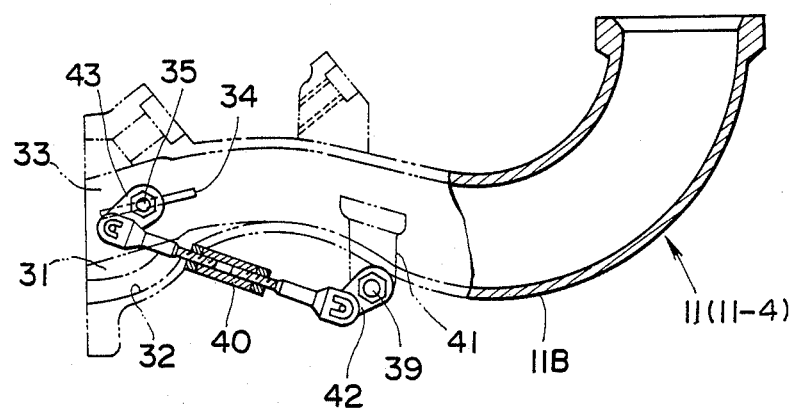
FIG. 6 is a rear view illustrating a link mechanism portion as seen from the rear side of the vehicle body.

As shown in FIGS. 2 and 5, the engine body 2 comprises mainly a cylinder block 3, a cylinder head 4, and a cylinder head cover 5. In each of the cylinder block 3 of the cylinders C1, C2, C3 and C4 is slidably inserted a piston 6. Each of the cylinders C1, C2, C3 and C4 has an opening for an intake port 7 formed on the cylinder head 4. The intake port 7 in turn has an opening to a side surface 4a of the cylinder head 4. The side surface 4a will be referred to as one side surface of the engine body 2. The side surface 4a is designed to be in parallel to the axial line l1. The line connecting the centers of the respective openings of the intake part 7 communicating with the outside of the cylinder head 4 is designed to be located on a horizontal line in this embodiment. Each of the intake ports 7 is opened or closed by an intake valve 8 at known timings in synchronism with the rotation of the engine output shaft (not shown).

Figure 3:
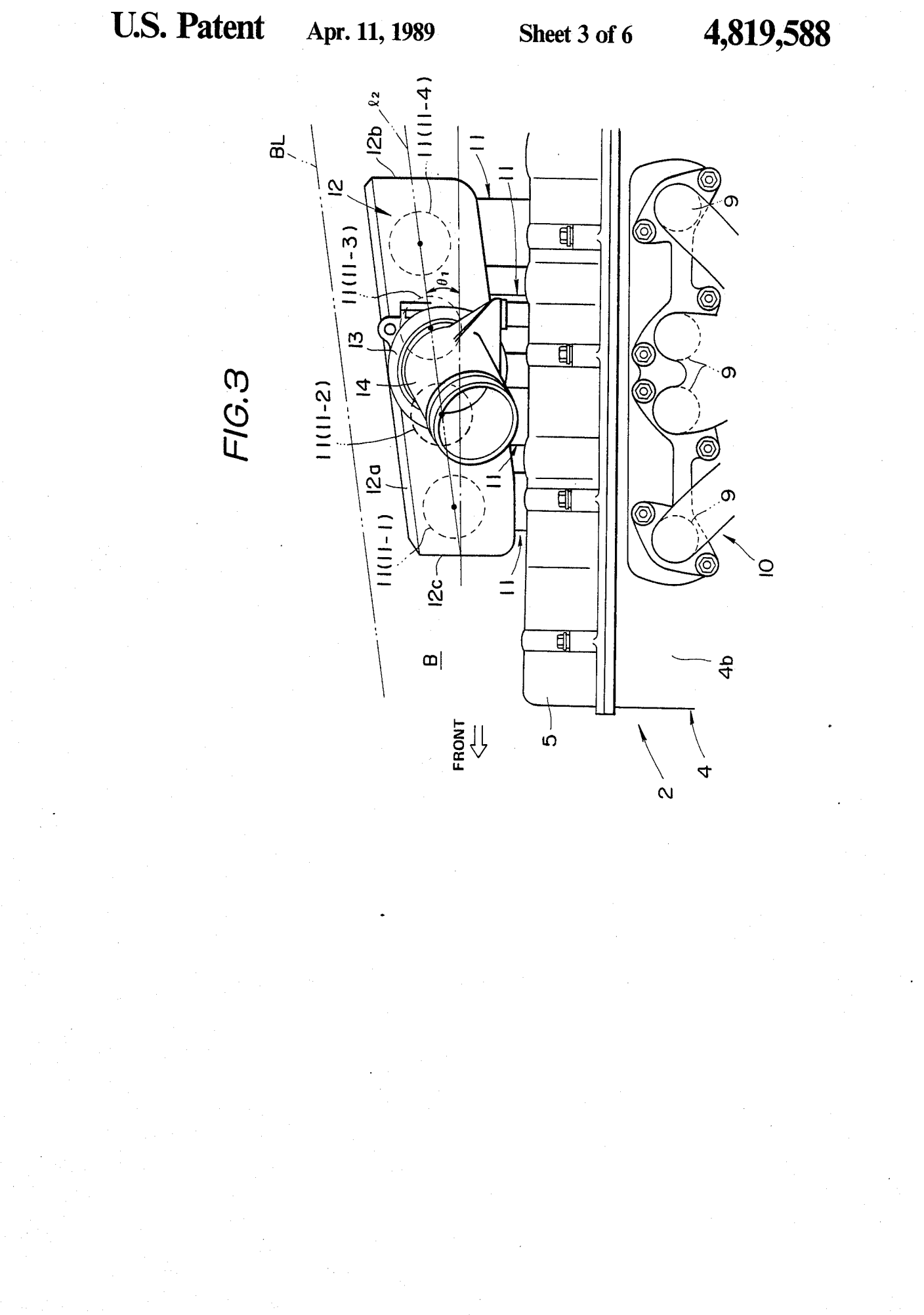

As shown in FIG. 3, an exhaust port 9 communicating with each of the cylinders C1, C2, C3 and C4 has an opening to another side surface 4b of the cylinder head 4 and is connected to an exhaust manifold 10.

An intake passage communicating with the intake port 7 is composed of a separate intake tube 11, a surge tank 12 constituting an air chamber to be used for increasing an air capacity, a throttle body 13, a common intake tube 14, and an air cleaner (not shown), in the order from the side of the intake port 7 to the upstream side. The separate intake tube 11 is designed so as to independently connect each of the cylinders C1, C2, C3 and C4 to the surge tank 12, and a fuel injection valve 15 is connected to each of the one end portions on the downstream side.

The surge tank 12 is located above the engine body 2 and at a position offset toward one side surface of the engine body 2 (one side surface 4a of the cylinder head 4). The surge tank 12 is designed so as to allow its lengthwise direction to be in the direction of the axial line l1, and the cross-sectional area perpendicular to the axial line l1 is designed so as to be substantially the same at whatever positions in the direction of the axial line l1. This arrangement permits a possibly uniform distribution of an intake air to each of the cylinders C1, C2, C3 and C4 from the surge tank 12.

The surge tank 12 is designed such that at least its upper surface 12a is inclined so as to cause its one end side in the direction of the axial line l1, i.e., the rear end side 12b of the vehicle body, to be positioned higher than the front end side 12c. In this embodiment, the surge tank 12 is arranged to be inclined as a whole. More specifically, as shown in FIG. 3, the imaginary center line 12 parallel to the upper surface 12a of the surge tank 12 is inclined at an inclination angle l1 with respect to the horizontal line H. The inclined arrangement of the surge tank 12 allows at least its upper surface 12a to be nearly parallel to the line BL of a bonnet for opening or closing the engine room B. In other words, as the bonnet's line BL is generally designed so as to be lowered forward, the upper surface 12a of the surge tank 12 is inclined in virtually parallel to the bonnet's line, thereby preventing the surge tank from interfering with the bonnet's line BL.

In the direction of the axial line l1, the middle position of the surge tank 12 is designed to be caused to correspond substantially to the middle positions of the respective cylinders C1, C2, C3 and C4 (referring to the line l3 in FIG. 1). This enables each of the separate intake tubes 11 to be symmetrical about the axial line 13 so that a manner of supplying an intake air to each of the cylinders C1, C2, C3 and C4 is preferably rendered as uniform as possible.

Each of the separate intake tubes 11 connecting independently each of the cylinders C1, C2, C3 and C4 to the surge tank 12 is juxtaposed in the direction of the axial line 11. The separate intake tube 11 is further designed to extend in the direction apart from one side surface 12d of the surge tank 12 and be curved in a direction turning toward the other side surface 4a (the intake port 7) of the engine body 2. More specifically, a curved portion 11a of the separate intake tube 11 is arranged so as to be curved downward at an angle of about 90 degree and again at an angle of about 90 degree back toward the side surface 4a of the engine body 2. The curved arrangements of the separate intake tubes 11 provide each a sufficient length for the separate intake tube 11. It is a matter of course that the inner diameters and lengths of the separate intake tubes 11 are set equal to each other.

The positions of the openings of the separate intake tube 11 on the one side surface 12d of the surge tank 12 are designed so as to descend from the separate intake tube provided at the position closer to the one end portion 12b thereof than that at the position proximate thereto. More specifically, the center position of the opening of each separate intake tube 11 is arranged to be positioned on the inclined line 12 as shown in FIG. 3. In other words, if the first separate intake tube for the first cylinder C1 is referred to as reference numeral 11-1, the second separate intake tube for the second cylinder C2 as 11-2, the third separate intake tube for the third cylinder C3 as 11-3, and the fourth separate intake tube for the fourth cylinder C4 as 11-4, the positions of the openings on the surge tank 12 are arranged so as to get lower in this order from 11-4 to 11-1.

This arrangement of the separate intake tube permits the effective supercharging due to the dynamic effect of the intake air in the range of a low rotation of an engine. The capacity of the surge tank 12 is set so as to become the minimum value necessary for the dynamic effect to be created by the intake air.

The separate intake tubes 11 are arranged such that the separate intake tube located at the position close to the rear side of the vehicle body is located at a position closer to the one side surface 4a of the engine body. In other words, the straight line 14 connecting one side surfaces of the curved portions 11a of the separate intake tubes 11 is caused to be curved at an angle $\theta 2$ with respect to the axial line 11, and the distance between the axial lines 11 and 14 is designed so as to converge toward the rear side of the vehicle body. That is, the separate intake tubes 11-1, 11-2, 11-3 and 11-4 are arranged such that the one side end of the separate intake tube 11-1 is farthest from the one side surface 4a of the engine body 2 and the others come narrower thereto in the consecutive order from 11-2 to 11-4, inclusive. The difference in distance from the one side surface 4a of the engine body 2 is based on a difference in the height between the upstream end and the downstream end between each of the separate intake tubes 11.

In this embodiment, each of the separate intake tubes 11 is constructed so as to be divided into two, the one portion being an upstream portion 11A and the other portion being a downstream portion 11B. The surface dividing the separate intake tube into the two portions is located roughly at the middle position of the curved portion 11a. The upstream portion 11A is formed integrally with the surge tank 12 and provided with a flange 11C facing downward for being connected to the downstream portion. The downstream portion 11B is constructed such that a flange 11D is formed facing upward to be connected to the upstream portion 11A. The upstream portion 11A is connected to the downstream portion 11B through the connecting flanges 111 and 11D, respectively. The connecting flange 11D is formed integrally with the downstream portion 11B of each of the separate intake tube 11 and further with a flange 11E on the downstream side, thereby leading to a secure arrangement of each separate intake tube 11 as a whole.

The boundary portion between each of the separate intake tubes 11 and the surge tank 12 is arranged such that the upper surface of the separate intake tube 11 is positioned as high as the upper surface 12a of the surge tank 12. This arrangement can preferably mount the surge tank 12 at the position as low as possible, thereby preventing the surge tank 12 from interfering with the bonnet's line BL and heightening the position of the upstream end portion of the separate intake tube 11 as high as possible, i.e., making the length of the separate intake tube 11 as long as possible.

In FIGS. 1 and 2, reference numeral 21 denotes a servo apparatus for a brake of the type as known as a servo assisted brake utilizing generally the differential pressure between the intake negative pressure and the atmospheric pressure. A stud bolt 22 protruding the servo apparatus 21 penetrates through the dash panel 1 extending backward, and the servo apparatus 21 is fixed to the dash panel 1 with a nut 22 fastened to the through portion. On the front surface of the servo apparatus 21 is fixed a master cylinder 24 that is constructed such that, as a brake pedal (not shown) is stepped on, the force applied on the brake is multiplied by the servo apparatus 21 and transmitted to the master cylinder 24.

A set of the servo apparatus 21 and the master cylinder 24, particularly the servo apparatus 21 with a large diameter, is positioned just in front of the separate intake tube 11 (more specifically, 11-4), and the axis 15 of the servo apparatus 21 is virtually parallel to the axial line 11. The servo apparatus 21 may be mounted or detached by inclining the servo apparatus 21 itself with respect to the axial line 11. The axis of the inclined servo apparatus 21 is referred to as 15'. With this arrangement, the servo apparatus 21 may be mounted or detached by avoiding the interference with the separate intake tube 11, particularly the intake tube 11-4, located proximate to the rear side of the vehicle body because the separate intake tube 11 positioned nearer to the rear side of the vehicle body is also located at the position closer to the one side surface 4a of the engine body 2.

Referring now to FIG. 5, the intake passage construction will be described below that extends from the vicinity of the downstream end portion of each separate intake tube 11 through the intake port 7 to each of the cylinders C1, C2, C3 and C4. It is to be noted here that, as the intake passage construction is the same among the cylinders C1, C2, C3 and C4, the description hereinbelow will be made on the first cylinder C1 as a representative example.

The intake passage in the intake port 7 and in the downstream side end portion of the separate intake tube 11(11-1) is divided by a partition 31 into a low load intake passage 32 and a high load intake passage 33. The low load intake passage 32 has an effective opening area smaller than the high load intake passage 33 and looks toward the tangential direction of the cylinder C1. The high load intake passage 33 has an effective opening area larger than the low load intake passage 32 and looks nearly toward the axis of the cylinder C1. In the high load intake passage 33 is mounted a control valve 34. The downstream end of the low load intake passage 32 has an opening to the high load intake passage 33 just up the intake valve 8.

With the arrangement as described hereinabove, on the one hand, the control valve 34 is closed totally or with a minute opening during a period of time when a low load is applied to the engine. This causes substantially a total amount of the intake air to be supplied to the cylinder C1 from the low load intake passage 32. As the intake air from the low load intake passage 32 is fast in velocity and is caused to be swirled in the cylinder C1, a combustion stability at the time of a low load can be ensured. When a high load is applied to the engine, on the other hand, the control valve 34 is opened so that the intake air is supplied from both the low load intake passage 32 and the high load intake passage 33, thereby improving a charging efficiency to ensure an engine output.

Each of the control valves 34 mounted in the separate intake tubes 11 is connected to each other with a common shaft 35 that in turn extends in the direction of the axis 11 ranging over each of the separate intake tube 11. The separate intake tubes 11 is provided at the downstream portion with a flange 11E and a supporting rib 11F formed integrally therewith. In the supporting rib 11F is formed a supporting hole 36 extending in the direction of the axis 11. The supporting hole 36 is formed such that its one end on the front end side of the vehicle body is closed and its other end on the rear end side thereof is opened. The common shaft 35 is inserted rotatively in the supporting hole 36, and only the rear end portion 35a is exposed to the outside from the supporting hole 36.

Figure 4:
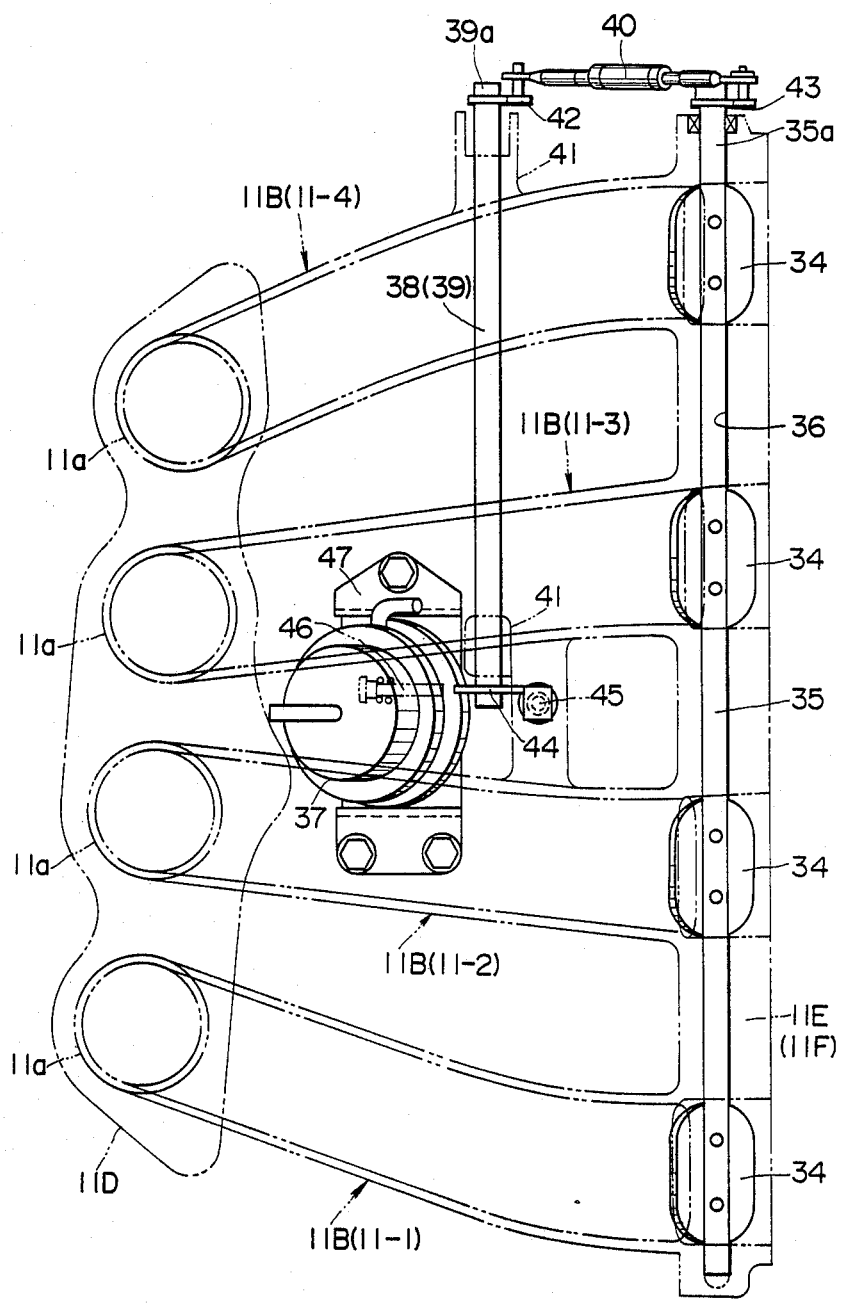
FIG. 4 is a schematic top view illustrating the relationship of the position of a control valve with respect to the separate intake tubes and the relationship of the position of an actuator.

In order to drive the common shaft 35 for opening or closing the control valve 34, there is mounted an actuator 37 that is of the vacuum operation type, in this embodiment, that causes the output shaft 37a to be operatively displaced upward in FIG. 2 when negative pressures are applied. The actuator 37 is disposed in a dead space X, as shown in FIG. 2, enclosed by each of the separate intake tubes 11 and the engine body 2. More specifically, the actuator 37 is located nearly in the middle position of the plural separate intake tubes 11 (FIG. 4) in the direction of the axis 11, and the output shaft 37a thereof extends between a pair of the separate intake tubes 11-2 and 11-3 downward below the separate intake tubes 11 from the dead space X. The actuator 37 is fastened with a bolt to the upper surfaces of the separate intake tubes 11-2 and 11-3 through a bracket 47.

The output shaft 37a of the actuator 37 is connected through a link mechanism 38 to the rear end portion 35a of the common shaft 35. The link mechanism 38 is provided with a first connecting shaft 39 extending in the direction of the axis 11 and a second connecting shaft 40 that connects the rear end portion 39a of the first connecting shaft 39 to the rear end portion 35a of the common shaft 35. The first connecting shaft 39 is long nearly by half the length of the common shaft 35 and is supported rotatively by a bracket 41 (FIG. 4) protruding from the lower end surfaces of a pair of the separate intake tubes 11-3 and 11-4. The rear end portion 39a of the first connecting shaft 39 is connected to one end portion of the second connecting shaft 40 through a first bell lever 42. The other end portion of the second connecting shaft 40 is connected to the rear end portion 35a of the common shaft 35 through a second lever 43. The second connecting shaft 40 is divisible and the length thereof can be adjusted using a screw. The output shaft 37a of the actuator 37 is further connected to the first connecting shaft 39 through a bell crank 44. When the output shaft 37a of the actuator 37 is displaced upward in FIGS. 2 and 5, then each of the control valves 34 is caused to be closed.

As shown in FIG. 5, the separate intake tube 11 is provided with a pair of stoppers 45 and 46 of the type adjustable with a screw so as to face the locus of the rotation of the bell crank 44. This structure permits an adjustment of positions of rotation stroke ends of the bell crank 44, i.e., positions of opening/closing stroke ends of the control valve 34.

As have been described hereinabove, the actuator 37 is mounted in the dead space X, thereby enabling the engine body 2 to be disposed adequately backward on the rear side of the vehicle body without a blockade from the actuator 37. As in the embodiment, only one end portion of the common shaft 35 is exposed to the outside, thereby enabling portions for sealing the inside and the outside of the separate intake tube 11 to be minimized to only one.

Figure 7:
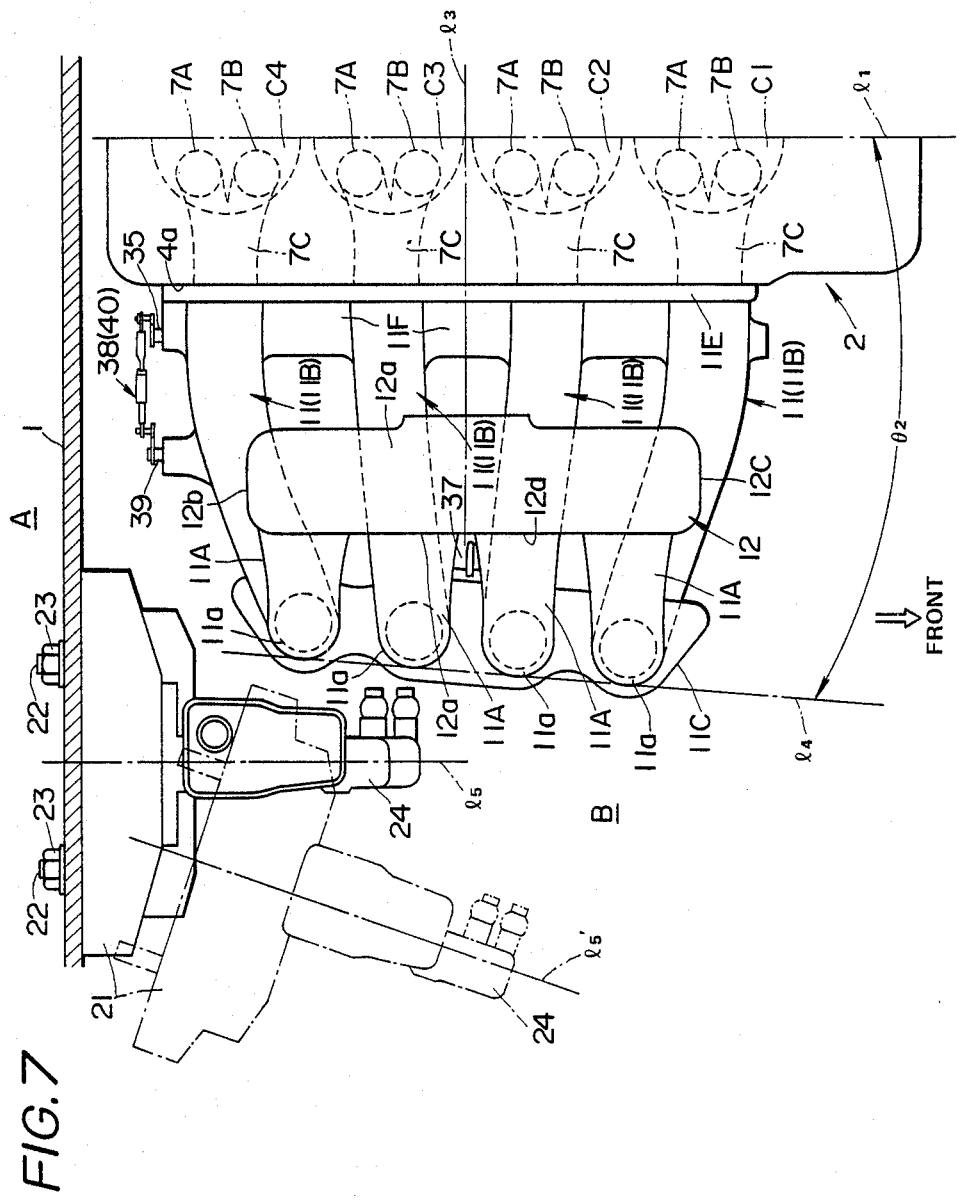
FIG. 7 is a top view illustrating another embodiment according to the present invention corresponding to FIG. 1.

FIG. 7 shows another embodiment according to the present invention. In the description on this embodiment, elements identical and similar to those indicated in the first embodiment will be indicated by identical reference numerals and symbols and a description thereon will be omitted for brevity.

In this embodiment, each of the cylinders C1, C2, C3 and C4 is provided with a pair of intake ports 7A and 7B that are designed to be united at the upstream portion into one common intake port 7C. To the common intake port 7C is connected each of the separate intake tube 11.

It is to be understood that the foregoing text and drawings relate to embodiments of the present invention given by way of examples but not limitation. Various other embodiments and variants are possible within the spirit and scope of the invention.

What is claimed is:

1. An intake apparatus for an engine, comprising:
    an engine body having a plurality of cylinders arranged in series along an axis and having on one side surface thereof an opening to an intake port for each of the cylinders;
    a surge tank located above said engine body and extending in a direction parallel to the axis;
    a plurality of separate intake tubes connecting independently openings in said surge tank to the intake port for each of said cylinders and being juxtaposed with each other in the direction parallel to the axis;
    each of said separate intake tubes having a substantially identical length and effective cross-sectional area, and being of a shape extending in a direction away from one side surface of said surge tank and then curving toward the one side surface of said engine body; and
    the openings for each of said separate intake tubes on said surge tank being arranged such that an opening on a first end side of said surge tank along the direction parallel to the axis is higher than an opening on a second end side of said surge tank along the direction parallel to the axis.

2. The intake apparatus as claimed in claim 1, wherein said engine body is located in a vehicle body which is separated by a dash panel into a vehicle chamber and an engine room, and said engine body is disposed in the engine room so that the axis of the cylinders is essentially perpendicular to the dash panel.

3. The intake apparatus as claimed in claim 2, wherein a servo apparatus for a brake is mounted in a space in the engine room located along the one side surface of said engine body.

4. The intake apparatus as claimed in claim 1, wherein with respect to the direction parallel to the axis, a middle position of said surge tank coincides with a middle position of said cylinders.

5. The intake apparatus as claimed in claim 1, wherein said openings in said surge tank each have a center, the centers being located on a center line which is inclined vertically with respect to the axis of the cylinders.

6. The intake apparatus as claimed in claim 5, wherein said surge tank is inclined so that the one end side of the surge tank is higher than the second end side.

7. The intake apparatus as claimed in claim 5, wherein an upper surface of a portion of each intake tube connected to said surge tank is essentially level with a top surface of said surge tank.

8. The apparatus as claimed in claim 6, wherein said surge tank is attached to said engine body and is offset from said one side surface of the engine body.

9. The intake apparatus as claimed in claim 1, further comprising:
   a control valve mounted in each of said separate intake tubes;
   a common shaft connecting said control valves together, said common shaft extending in a direction parallel to the axis; and
   an actuator for driving said control valves disposed in a space enclosed by said engine body and said separate intake tubes, said actuator comprising an output shaft connected to one end portion of said common shaft via a link mechanism.

10. The intake apparatus as claimed in claim 9, wherein with respect to the direction parallel to the axis, said actuator is located essentially at a mid portion of said separate intake tubes, and said output shaft extends out from the space enclosed by said engine body and said separate intake tubes between a pair of said intake tubes.

11. The intake apparatus as claimed in claim 10, wherein each of said separate intake comprises an intake passage portion located at a downstream portion of said intake tubes, each of said intake passage portions being divided by a partition into a low load intake passage and a high load intake passage, said control valves being mounted so as to selectively open and close high load intake passage of each of said intake passage portions.

12. An intake apparatus for an engine, comprising:
   an engine body having a plurality of cylinders arranged in series along an axis and having on one side surface thereof an opening to an intake port for each of the cylinders;
   a surge tank located above said engine body and extending in a direction parallel to the axis;
   a plurality of separate intake tubes connecting independently openings in said surge tank to the intake port for each of said cylinders and being juxtaposed with each other in the direction parallel to the axis;
   each of said separate intake tubes having a substantially identical length and being of a shape extending in a direction away from one side surface of said surge tank and then curving toward the one side surface of said engine body;
   the openings for each of said separate intake tubes on said surge tank being arranged such that an opening on a first end side of said surge tank along the direction parallel to the axis is higher than an opening on a second end side of said surge tank along the direction parallel to the axis; and
   an upper surface of said surge tank being disposed substantially parallel to a bonnet disposed over the engine and defining an engine room.

13. The intake apparatus as claimed in claim 12, wherein said separate intake tubes each have essentially identical effective opening area.

14. The intake apparatus as claimed in claim 12, wherein said openings in said surge tank each have a center, the centers being located on a center line which is inclined vertically at a predetermined angle from a line passing through centers of the openings in said engine body.

15. The intake apparatus as claimed in claim 14, wherein the line passing through the centers in said engine body is essentially horizontal.

16. The intake apparatus as claimed in claim 14, wherein said separate intake tubes each have essentially identical effective opening area.

* * * * *